(12) United States Patent
Wilkinson et al.

(10) Patent No.: US 10,949,793 B2
(45) Date of Patent: Mar. 16, 2021

(54) SYSTEMS AND METHODS FOR MONITORING ITEM DISTRIBUTION

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 4 days.

(21) Appl. No.: 16/562,056

(22) Filed: Sep. 5, 2019

(65) Prior Publication Data

US 2019/0392386 A1    Dec. 26, 2019

Related U.S. Application Data

(63) Continuation of application No. 15/845,365, filed on Dec. 18, 2017, now Pat. No. 10,430,751.

(Continued)

(51) Int. Cl.
*G06Q 10/08* (2012.01)
*G06F 16/25* (2019.01)
(Continued)

(52) U.S. Cl.
CPC ....... *G06Q 10/0833* (2013.01); *G06F 16/252* (2019.01); *G06F 16/7867* (2019.01);
(Continued)

(58) Field of Classification Search
CPC .......... G06Q 10/0833; G06K 9/00711; G06K 9/00335; G06K 9/4604; G06K 9/00771;
(Continued)

(56) References Cited

U.S. PATENT DOCUMENTS 7,455,225 B1 * 11/2008 Hadfield ................ G07C 5/085
235/384
8,793,013 B2 * 7/2014 Kleine ..................... B66F 9/08
700/218

(Continued)

FOREIGN PATENT DOCUMENTS

CN    203786522    8/2014

OTHER PUBLICATIONS

3IProtect; "Camera Systems"; http://3iprotect.com/camera-systems/; 2015; pp. 1-3.

(Continued)

*Primary Examiner* — Joseph Suh
(74) *Attorney, Agent, or Firm* — Fitch, Even, Tabin & Flannery LLP

(57) ABSTRACT

In some embodiments, apparatuses and methods are provided herein useful to monitoring item distribution. In some embodiments, there is provided a system for monitoring item distribution including: a camera system comprising a plurality of cameras configured to capture a plurality of video streams along a distribution chain; an item record database comprising one or more monitored items; and a control circuit configured to: receive the plurality of video streams; identify a monitored item of the one or more monitored items; extract video data associated with the monitored item from at least one of the plurality of video streams; aggregate the video data to form an item distribution record; associate the item distribution record of the monitored item with a customer order for the monitored item in the item record database; and provide the item distribution record to a user associated with the customer order via an item record user interface.

22 Claims, 11 Drawing Sheets

Related U.S. Application Data

(60) Provisional application No. 62/437,931, filed on Dec. 22, 2016.

(51) Int. Cl.
  *G06K 9/00* (2006.01)
  *H04N 5/247* (2006.01)
  *G06F 16/78* (2019.01)
  *G06K 9/46* (2006.01)

(52) U.S. Cl.
  CPC ...... *G06K 9/00335* (2013.01); *G06K 9/00711* (2013.01); *G06K 9/00771* (2013.01); *G06K 9/4604* (2013.01); *H04N 5/247* (2013.01); *G06K 2009/00738* (2013.01)

(58) Field of Classification Search
  CPC .......... G06K 2009/00738; H04N 5/247; G06F 17/3082; G06F 17/3056
  See application file for complete search history.

(56) References Cited

U.S. PATENT DOCUMENTS

| | | | |
|---|---|---|---|
| 8,798,784 B1 | 8/2014 | Clark | |
| 8,825,200 B2* | 9/2014 | Carpenter | B07C 7/005 700/224 |
| 8,874,256 B2* | 10/2014 | Mylet | B65G 67/06 700/214 |
| 10,013,883 B2* | 7/2018 | Farnham, IV | G08G 1/0129 |
| 10,430,751 B2 | 10/2019 | Wilkinson | |
| 2004/0128265 A1* | 7/2004 | Holtz | G07B 17/00362 705/406 |
| 2004/0165748 A1* | 8/2004 | Bonner | G06K 9/00973 382/101 |
| 2008/0187219 A1* | 8/2008 | Chen | H04N 7/18 382/173 |
| 2009/0268027 A1* | 10/2009 | Yang | G06K 9/00805 348/148 |
| 2012/0218215 A1* | 8/2012 | Kleinert | G06F 3/0487 345/173 |
| 2012/0269387 A1* | 10/2012 | Becker | G06T 7/254 382/103 |
| 2013/0027561 A1* | 1/2013 | Lee | G06K 9/00302 348/150 |
| 2014/0156472 A1* | 6/2014 | Stuntebeck | G06Q 10/087 705/28 |
| 2014/0247347 A1* | 9/2014 | McNeill | G06T 7/0004 348/143 |
| 2015/0234387 A1 | 8/2015 | Mullan | |
| 2015/0352721 A1* | 12/2015 | Wicks | B25J 9/1664 700/228 |
| 2016/0071544 A1* | 3/2016 | Waterston | G11B 27/031 386/278 |
| 2016/0171434 A1 | 6/2016 | Ladden | |
| 2016/0247537 A1* | 8/2016 | Ricciardi | G11B 27/036 |
| 2016/0255969 A1 | 9/2016 | High | |
| 2017/0154383 A1* | 6/2017 | Wood | G06Q 40/08 |
| 2017/0213062 A1* | 7/2017 | Jones | G06K 9/0063 |
| 2018/0049840 A1* | 2/2018 | Awdeh | A61B 3/13 |
| 2018/0101920 A1* | 4/2018 | Lantsman | G06Q 40/06 |
| 2018/0139278 A1* | 5/2018 | Bathen | H04L 9/3236 |
| 2018/0174394 A1* | 6/2018 | Chirnomas | G07F 11/58 |
| 2018/0181909 A1 | 6/2018 | Wilkinson | |

OTHER PUBLICATIONS

Longman, Nye; "Don't let your merchandise out of your sight, even when it's left the warehouse"; http://www.supplychaindigital.com/warehousing/dont-let-your-merchandise-out-your-sight-even-when-its-left-warehouse; Apr. 12, 2016; pp. 1-9.

PCT; App. No. PCT/US2017/066260; International Search Report and Written Opinion dated Mar. 7, 2018.

U.S. Appl. No. 15/845,365; Notice of Allowance dated May 17, 2019; (pp. 1-6).

U.S. Appl. No. 15/845,365; Office Action dated Jan. 10, 2019; (pp. 1-18).

* cited by examiner

SYSTEMS AND METHODS FOR MONITORING ITEM DISTRIBUTION

CROSS-REFERENCE TO RELATED APPLICATION

This application is a continuation of U.S. application Ser. No. 15/845,365, filed Dec. 18, 2017, which claims the benefit of U.S. Provisional Application No. 62/437,931, filed Dec. 22, 2016, all of which are incorporated herein by reference in their entirety.

TECHNICAL FIELD

This invention relates generally to monitoring retail item distribution.

BACKGROUND

Generally, a retail item ordered by a customer may be received without problems or issues. Thus, the item may have been transported and delivered to the customer's satisfaction. However, there may be times that the item received might have problems, issues, or may have been damaged. Investigating how, when, and where the problem occurred may be time consuming and/or financially unproductive.

BRIEF DESCRIPTION OF THE DRAWINGS

Disclosed herein are embodiments of systems, apparatuses and methods pertaining to monitoring item distribution. This description includes drawings, wherein.

Figure 1:
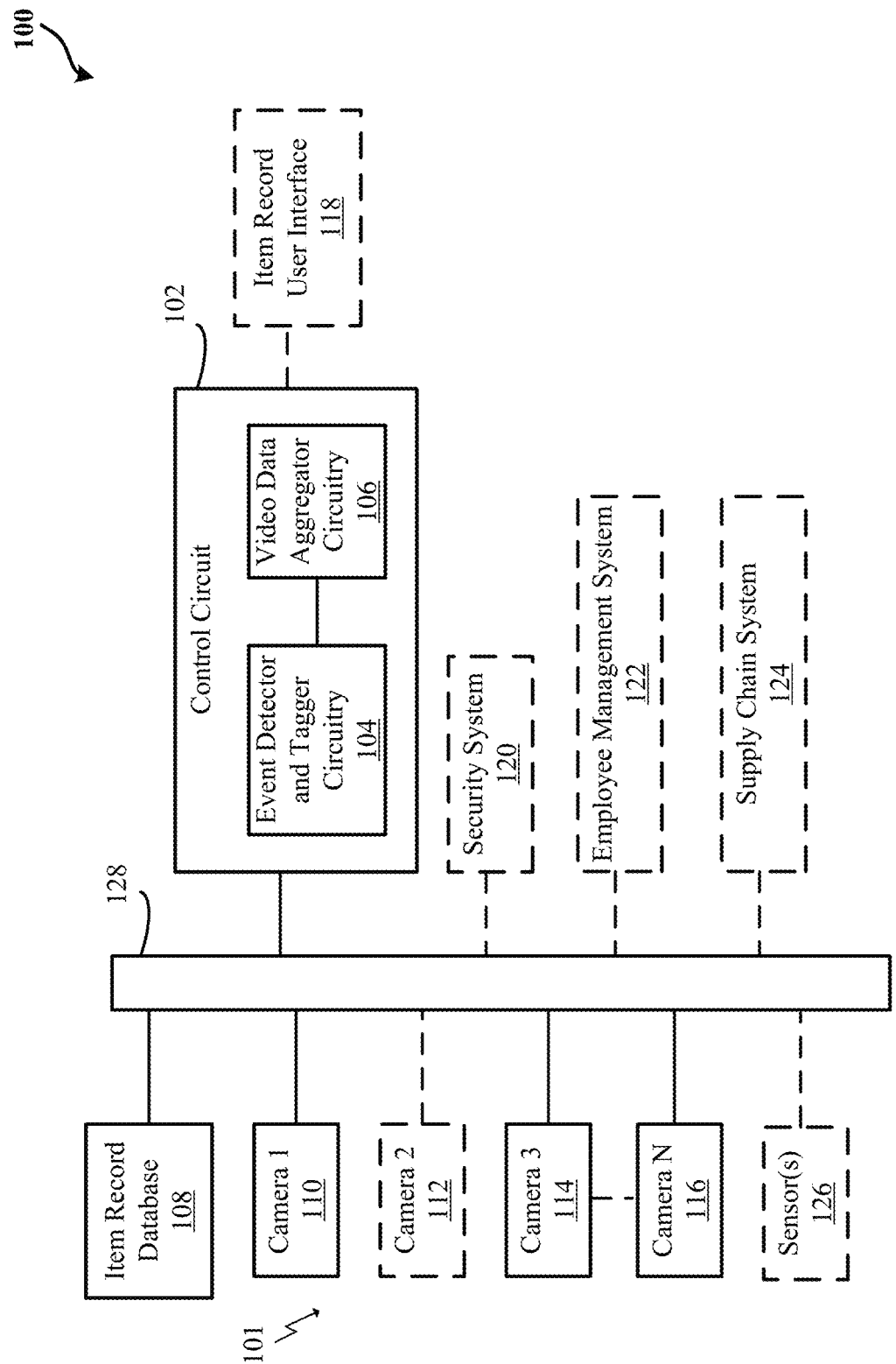
FIG. 1 illustrates a simplified block diagram of an exemplary system for monitoring item distribution in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for monitoring retail item distribution. In some embodiments, a monitoring system a camera system that includes at least one and typically a plurality of cameras positioned and configured to capture a plurality of video streams along a distribution chain. The plurality of cameras may include at least one distribution center camera system and at least one on-vehicle camera system configured to capture images (e.g., video streams content, still images, sequence of images, etc.) of a storage compartment of a transport vehicle. The system may include a retail item record database and a control circuit. The control circuit may be coupled to the camera system and/or a content storage that stores the captured images to be accessed by at least the control circuit. Further, the control circuit may be coupled with the item record database. The control circuit may receive the plurality of video streams captured by the camera system. A monitored retail item may be identified in the plurality of video streams by the control circuit, and extract video data associated with the monitored item from at least some of the plurality of video streams. In some embodiments, the control circuit may aggregate the video data to form an item distribution record recording a movement (may also be referred to as displacement) of the monitored item along at least a portion of the distribution chain. By one approach, the control circuit may associate the item distribution record of the monitored item with a customer order for the monitored item in the item record database. The control circuit may also provide access to the item distribution record to a user associated with the customer order via an item record user interface. The user may include a customer, an associate of a retail facility, an investigator, a surveillance monitor, and/or a third party contractor, among other possible users.

In some embodiments, there is provided a method for monitoring retail item distribution. A plurality of video streams are received from a camera system that include a plurality of cameras configured to capture the plurality of video streams along a distribution chain. The plurality of cameras may include at least one distribution center camera system and at least one on-vehicle camera system configured to capture images of a storage compartment of a transport vehicle. The method may include identifying, with a control circuit, a monitored item in the plurality of video streams. Video data can be extracted that is associated with the monitored item from at least some of the plurality of video streams. By one approach, the method may aggregate, with the control circuit, the video data to form an item distribution record recording a movement of the monitored item along the distribution chain. Some embodiments associate the item distribution record of the monitored item with a customer order for the monitored item in an item record database. The method may also include providing the item distribution record to a user associated with the customer order via an item record user interface.

In yet some embodiments, there is provided an apparatus for monitoring item distribution including a non-transitory storage medium. The non-transitory storage medium may store a set of computer readable instructions. The apparatus may also include a control circuit configured to execute the set of computer readable instructions. Executing the set of computer readable instructions may cause to the control circuit to receive a plurality of video streams from a camera system. The camera system may include a plurality of cameras configured to capture the plurality of video streams along a distribution chain. The plurality of cameras may include at least one distribution center camera system and at least one on-vehicle camera system configured to capture images of a storage compartment of a transport vehicle. The control circuit may identify a monitored item in the plurality of video streams. The control circuit may also extract video data associated with the monitored item from at least some of the plurality of video streams. By one approach, the control circuit may aggregate the video data to form an item distribution record recording a movement of the monitored item along the distribution chain. The control circuit may associate the item distribution record of the monitored item with a customer order for the monitored item in an item record database. Alternatively, or in addition to, the control circuit may provide the item distribution record to a user associated with the customer order via an item record user interface. The user may include a customer, an associate of a retail facility, an investigator, a surveillance monitor, and/or a third party contractor, among other possible users.

In some embodiments, a system is disclosed that monitors the distribution of retail items (or multiple different monitored retail items). An ordering system of a retail facility may receive an order from a customer for an item. The ordering system may communicate the order to an inventory system to determine which distribution center may best process the order. The order is then processed at a particular distribution center. A processing system may communicate with the inventory system to locate the item in the distribution center. Once the item is located, the inventory system may send a notification to a first associate regarding the location of the item. The first associate may acquire the item by physically acquiring the item, which can then be loaded into a transport vehicle. Alternatively, or in addition to, a robotic device may acquire, cause the loading of, and/or load the item into the transport vehicle.

Once the item is loaded into the transport vehicle, a second associate may drive the transport vehicle and make a delivery to a delivery destination. A customer can acquire the item at the delivery destination (e.g., customer's home, customer's place of work, a retail store, or other such destination). The customer may inspect the item for problems, issues, or damage before and/or after accepting the delivery. If there is problem, issue, or damage to the item, an associate may record the problem, issue, or damage to the item in a problem resolution system. The problem resolution system is a system that records and tracks problems, issues, and/or damages to items that are scheduled for delivery and/or items being delivered. In another configuration, the problem resolution system may also record and track resolutions or action(s) to resolve the problems, issues, and/or damages to the items.

In some instances, an associate may identify a problem, issue and/or damage relative to the item prior to delivery to the customer, and report the problem, issue and/or damage into the problem resolution system. In another scenario, an associate may be unable to make the delivery due to the item being missing. Thus, the system may provide an item distribution record that includes a video graphical account of what may have caused the item to be missing or what may have caused the problem, issue, and/or damage relative to the item. Alternatively or in addition to, the item distribution record may include a graphical representation of displacement of one item based on displacement of another item.

As an illustrative non-limiting example, a transport vehicle may have a rack having multiple shelves within a cargo area, where one or more items for delivery may be placed in each shelf of the rack. A camera inside the transport vehicle may capture images of the one or more items during the delivery. However, due to the location of the camera inside the transport vehicle, the camera may only capture video images of those items on a first shelf of the rack. During the delivery, an event may occur causing a few of the one or more items to be displaced from their original position. Consequently, because of the camera positioning, video images associated with items on other shelves are not available. However, the system may determine the effect of such an event to those items outside the field of view of the camera based on the captured video images of those items on the first shelf at the time of the event.

For example, in a non-limiting illustrative scenario during the event, the captured video images may show that a first item of the first shelf may tip over and hit a second item next to it. The system may determine that a similar effect may have occurred with an item (hidden from the camera) on the second shelf that is placed directly above the first item of the first shelf. Thus, to illustrate the causal effect of the event to the item hidden from the camera, the system may generate a graphical representation of postulated displacement of the item on the second shelf relative to the actual displacement of the first item on the first shelf based on the captured video images. The graphical representation may include a 2-D or 3-D pictographical representation of the postulated displacement of the item on the second shelf, among other possible graphical representations that may be generated by the control circuit 102 to show what may have happened to the item on the second shelf during the event.

Figure 2:
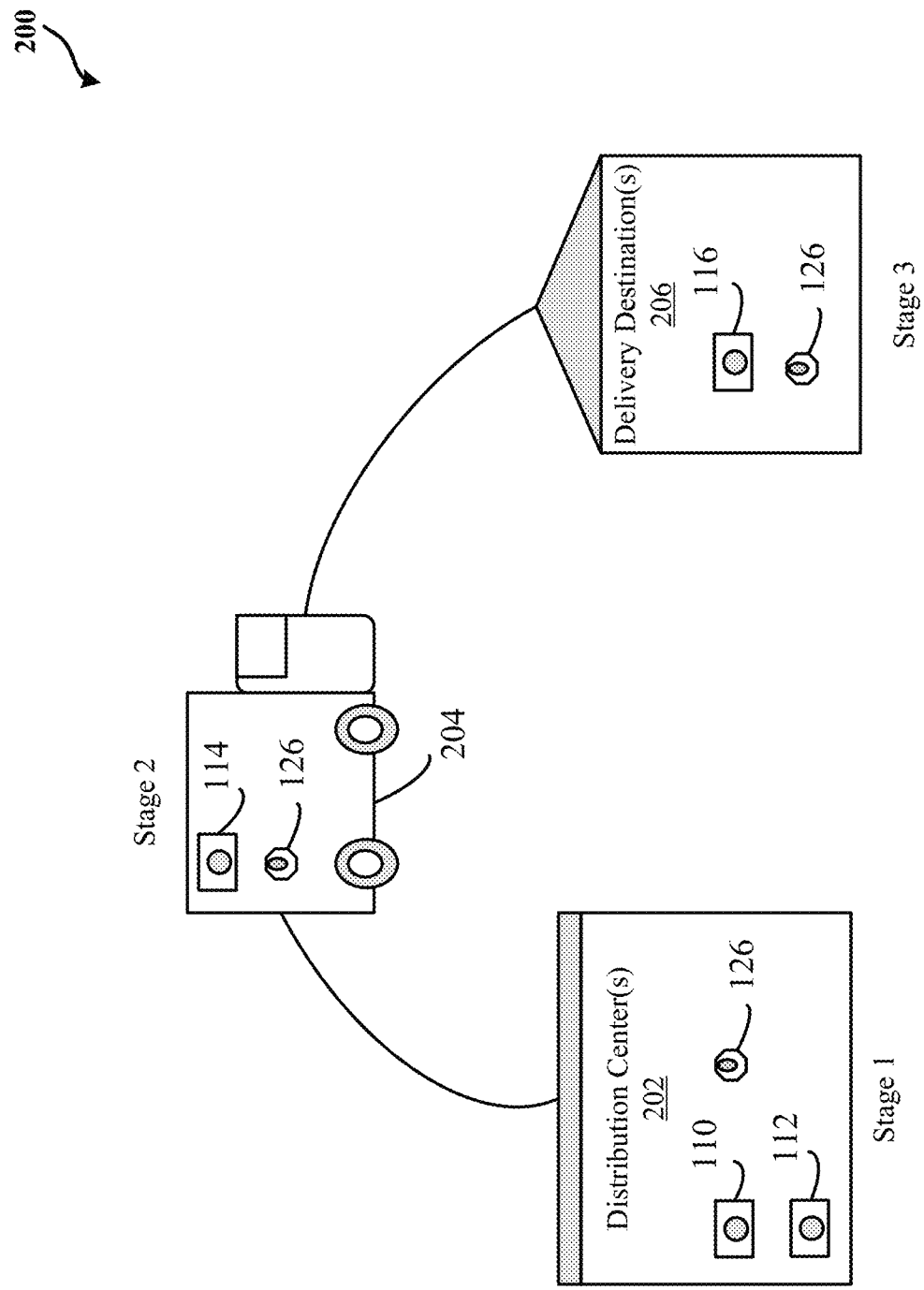
FIG. 2 is a simplified schematic illustration of an exemplary distribution chain in accordance with some embodiments.

FIG. 1 illustrates a simplified block diagram of an exemplary system 100 that monitors item distribution. FIG. 2 illustrates a simplified schematic illustration of an exemplary distribution chain 200, in accordance with some embodiments. Referring to FIGS. 1 and 2, the system 100 may include a camera system or network 101. The camera network may include a plurality of camera systems 110, 112, 114, 116 configured to capture a plurality of images and/or video streams along a distribution chain 200. By one approach, one or more of the plurality of camera systems 110, 112, 114, 116 may continuously capture the plurality of images and/or the video streams, for example, starting at loading of the transport vehicle 204 to final delivery at delivery destination(s) 206. In another example, the camera systems 110, 112, 114, 116 may continuously capture the plurality of images and/or the video streams for a period of time. In another example, the camera systems 110, 112, 114, 116 may initiate capturing the plurality of images and/or the video streams based on one or more schedules. The one or more schedules may be based on where an order falls in an order fulfillment process of a retail distribution center 202 and/or the retail distribution chain 200. Thus, one of the camera systems 110, 112, 114, 116 that is associated with a particular area and/or retail department may be activated according to where the order falls in the order fulfillment process. In another example, the control circuit 102 may access the plurality of images and/or the video streams captured by the camera systems 110, 112, 114, 116 based on sensed data received from sensor(s) 126. In such an example, the plurality of images and/or the video streams may be accessed and/or extracted that start at a first range of time prior to receiving the sensed data and may end at a second range of time after receiving the sensed data.

The distribution chain 200 may include the distribution center(s) 202, the delivery destination(s) 206, and at least one transport vehicle 204. Thus, in one configuration, the distribution chain 200 may include a plurality of distribution centers and a plurality of transport vehicles 204. One or more cameras 110 of one or more camera systems 101 can be positioned to capture images, video streams and/or other such image content that can be used at least in part by a control circuit 102 to monitor the distribution chain 200. The transport vehicle(s) 204 may include a truck, a car, a plane, an unmanned ground delivery vehicle, unmanned aerial delivery vehicle, and other such vehicles. Further, one or more of the transport vehicle(s) 204 may correspond to a vehicle configured for delivery and/or a vehicle belonging to an associate, a customer, and/or a person who has agreed to make the delivery.

In some embodiments, a first camera system 110 of the plurality of camera systems 101 may be associated with a distribution area at or in a distribution center 202. The first camera system 110 may capture a first video stream or plurality of images and/or video streams associated with a plurality of items in the distribution area. For example, the first camera system 110 may be positioned to capture first video data in one or more of: an item picking area, an item conveyor system, an item consolidation area, an item packing area, loading dock or bay area, and/or other such areas of the distribution center 202. By one approach, the first video data may include first video images of at least one associate and/or at least one robotic device retrieving one or more retail items of an order and/or in fulfilling at least one order for one or more items. In some instances, the fulfillment of an order may include at least one associate and/or robotic device taking an items from a shelf, a storage area, an inventory area, or other area of the distribution center 202. The item is further transported to a loading dock or staging area in the distribution center 202 in preparation to be loaded into the transport vehicle 204. Thus, the first camera system 110 may include one or more cameras at the distribution center 202 positioned and configured to capture video streams associated with retrieving one or more items from one or more areas of the distribution center 202 as at least part of fulfilling a customer order of one or more items.

In another configuration, a second camera system 112 may capture a second plurality of video streams associated with at least one loading area (e.g., loading dock, loading bay, etc.) of the distribution center(s) 202. For example, the second camera system 112 may be positioned to capture second video data in an item loading area. The second plurality of video streams may include the second video data associated with loading the one or more items in the transport vehicle 204. The second video data may include video images of a second associate and/or a second robotic device taking the one or more items (e.g., from the first associate and/or the first robotic device) and loading the one or more items into the transport vehicle 204. In some configuration, the second associate and/or the second robotic device are the same as the first associate and/or the first robotic device. In some embodiments, one or more items may be loaded to the transport vehicle 204 via a mechanized loading system, such as a conveyor system, a forklift, among other things.

A third camera system 114 of the plurality of cameras may capture a third plurality of video streams associated with the transport vehicle 204. For example, one or more cameras of the third camera system 114 may be located or mounted inside and/or outside of the transport vehicle 204. The one or more cameras may include on-vehicle camera system. By one approach, the third plurality of video streams may include third video data including video images of the one or more items en route to the delivery destination(s) 206. The video images may be captured inside the transport vehicle 204. As such, the third video data may include images of one or more storage compartment of the transport vehicle 204. By another approach, the third video data may be associated with images around and/or proximate to the transport vehicle 204. For example, the third video data may include video images of activities around and/or a number of distance away from the transport vehicle 204. In one configuration, the third camera system 114 may include one or more cameras configured to capture the third plurality of video streams.

Some embodiments may include a fourth camera system 116 that captures a fourth plurality of video streams associated with unloading the transport vehicle 204 at the delivery destination 206 or an intermediate destination or transfer location where the item may be unloaded from one vehicle and loaded into another vehicle. By one approach, an associate and/or a robotic system at the destination location may unload the transport vehicle 204. Moreover, the fourth plurality of video streams may include fourth video data including video images of the associate and/or robotic system moving the one or more items from the transport vehicle 204. Further, the cameras may capture images and/or video streams of an item being delivered to a customer and/or a receiver at the delivery destination(s) 206. The fourth camera system 116 may include one or more cameras configured to capture the fourth video data associated with unloading of the one or more items off the transport vehicle 204 and/or delivering the one or more items to the customer and/or the receiver at the delivery destination(s) 206. The fourth camera system 116 may cooperate with the one or more of cameras of the camera system 114. The fourth camera system 116 may include a body camera. In one configuration, the control circuit 102 may configure cameras along the distribution chain 200 to be associated with one or more of the camera systems 110, 112, 114, 116. For example, the control circuit 102 may associate body cameras with the fourth camera system 116 and worn by one or more delivery agents on their person at one or more stages of the distribution chain 200.

As such, the control circuit 102 may identify a monitored item and extract video data associated with the monitored item from the one or more of the plurality of video streams corresponding to the camera systems 110, 112, 114, 116. Thus, the control circuit 102 may aggregate the video data to form, at least in part, an item distribution record, where the item distribution record records and/or presents one or more recordings of at least movement (or displacement) of the monitored item along the distribution chain 200.

By another approach, the camera system 110, the camera system 112, the camera system 114, and/or the camera system 116 may correspond to a camera system including a plurality of cameras configured to work cohesively. For example, each camera systems 110, 112, 114, 116 may include a plurality of cameras configured to capture video images of a particular location and/or area. In one non-limiting illustrative example, a first inventory room may have a number of cameras, where each camera may capture video images of a specific portion of the first inventory room and/or provide video coverage for a particular group of inventories located in the specific portion of the first inventory room. As such, the cumulative video images from the number of cameras may show what may have transpired in the first inventory room for a period of time. In one configuration, the plurality of video streams captured by the camera systems 110, 112, 114, 116 may be stored in a storage device (not shown) and accessed by the control circuit 102.

In some embodiments, the system 100 include the control circuit 102 that communicatively couples via a network 128 with the one or more of the camera systems 110, 112, 114, 116, and/or one or more data storage devices and/or database that receive and store images and/or video streams captured by the one or more camera systems of the retail distribution monitoring system 100. The network 128 may be a wireless network, a wired network, one or more distributed communication networks, or any combination thereof. The control circuit 102 may access and/or receive the plurality of video streams from the camera systems, storage and/or databases. The plurality of video streams may include images, video data (including video segments, video object data, movement vector data, and movement path data), and/or video frames captured by the first camera 110, the second camera 112, the third camera 114, and/or the fourth camera 116. The control circuit 102 may perform image processing and/or image recognition to the plurality of video streams to identify an item in one or more video frames and/or video data of the plurality of video streams. By one approach, the control circuit 102 may receive a request to identify the item in the plurality of video streams. In response to identifying the item, the control circuit 102 may flag the item in the video frames and/or video data of the plurality of video streams. As such, the control circuit 102 may track displacement of the item and/or capture sequence of events affecting the item during the delivery. Thus, the control circuit 102 may detect one or more events affecting the item based on the tracked displacement of the item and/or the captured sequence of events.

By one approach, the control circuit 102 may extract video data associated with the item from at least one of the plurality of video streams captured by camera system. The extracted video data may be aggregated, by a video data aggregator circuitry 106, to form, at least in part, an item distribution record. In one example, aggregating the video data may include stitching together a plurality video segments associated with the item from the plurality of video streams in chronological order. In another example, the aggregation of the video data may include updating a blockchain maintained at a plurality of computer systems with the video data associated with the item from the at least one of the plurality of video streams (see FIGS. 6-11 and corresponding paragraphs for discussion of blockchain).

Moreover, the item distribution record may include video recordings of displacement of the item along the distribution chain 200. The item distribution record may also include sensor data received by the control circuit 102 from sensor(s) 126. The sensor(s) 126 may be configured to provide sensor data to the control circuit 102. The sensor data may include motion data, acceleration data, displacement data, temperature data, sound data, and/or optical data, among other types of data that may be provided by a sensor. The control circuit 102 may detect one or more events associated with the item (as previously explained above) and correlate the one or more events in the extracted video data with the sensor data provided by the sensor(s) 126. An item record database 108 may include item identifier(s) associated with items that may be ordered by customers and associated with item distribution records (or one or more item distribution records). In one configuration, the control circuit 102 may associate, in the item record database 108, the item with the item distribution record. The item distribution record may be provided by the control circuit 102 to a user associated with a customer order via an item record user interface 118. The user may include a customer, an associate of a retail facility, an investigator, a surveillance monitor, and/or a third party contractor, among other possible users.

In some configurations, the control circuit 102 may include an event detector and tagger circuitry 104 and the video data aggregator circuitry 106. The event detector and tagger circuitry 104 may detect one or more events based on the video data associated with the item (as previously described). By one approach, the one or more events may be detected prior to extraction of video data from the plurality of video streams. By another approach, the one or more events may be detected after extraction of the video data from the plurality of video streams. In response to detecting the one or more events, the control circuit 102 may tag the detected one or more events in the plurality of video streams to facilitate identification of the one or more events associated with the item. In one example, one or more event tags may include tags associated with one or more of: a shock event, a drop event, a shrinkage event, a tampering event, a temperature event, a damage event (including a drop event, among other damage events), and/or other such events. The shrinkage event may include one or more events associated with damage, loss, theft, or other events that render one or more items unsellable.

Still referring to FIGS. 1 and 2, in some embodiments, the distribution chain 200 includes three stages: stage 1, stage 2, and stage 3. In another configuration, the distribution chain 200 may instead have two stages or four or more stages depending on the number of the distribution center(s) 202, the delivery destination(s) 206, intermediate transfer locations, and/or the transport vehicle 204 in the distribution chain 200. By one approach, an order may include a plurality of items located in multiple distribution centers 202, where one or more of the plurality of items may be delivered in separate transport vehicles 204 and/or destined to one or more delivery destinations 206. By one approach, the distribution chain 200 may include a plurality of distribution centers and a plurality of transport vehicles each monitored by one or more cameras of the plurality of camera systems.

Figure 3:
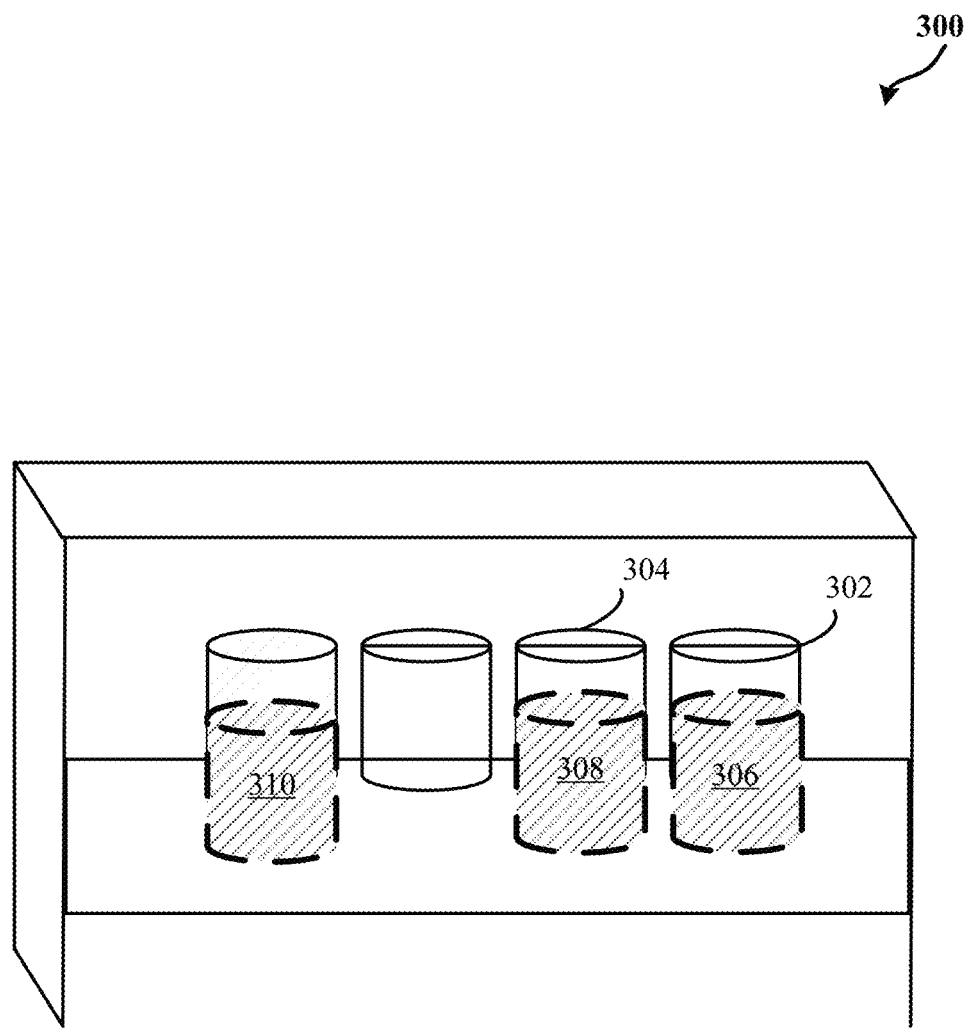
FIG. 3 is a schematic illustration of an exemplary shelf supporting items to be distributed in accordance with some embodiments.

FIG. 3 illustrates a schematic illustration of an exemplary shelf 300 including the items to be distributed 302, 304, 306, 308, 310 (may also be referred to as monitored items). In another configuration, the shelf 300 may correspond to a shelf in one or more racks in the distribution center(s) 202 or the transport vehicle 204. In another configuration, the items may be on a table, in a box, or other such containers suitable for shipping, storing, or transporting. The sensor(s) 126 may be associated with the shelf 300 or with one or more of the items 302, 304, 306, 308, 310.

In a non-limiting illustrative example, the stage 1 in FIG. 2 may include activities associated with fulfilling an order for the item 302, such as locating, preparing, and/or shipping (may also include loading). The order for the item 302 may be received by a retailer via in-store or online through an ordering system. The ordering system may communicate the order to a supply chain system 124 and/or an employee management system 122. The supply chain system 124 may include a point-of-sale server and/or an inventory server, among other systems or servers that are associated with a supply chain of a retail facility.

In another illustrative non-limiting example, an order is received for the item 302. By one approach, the distribution center(s) 202 may have the item 302 in its inventory. As such, an associate may manually locate the item 302. The same or another associate may load the item 302 into the transport vehicle 204. Alternatively, or in addition to, one or more robotic devices may locate and load the item 302 into the transport vehicle 204.

One or more of the first camera system 110 and/or the second camera system 112 (may also be referred to as distribution center camera system) may capture the first and second plurality of video streams associated with fulfilling the order for the item 302. The one or more of the first camera system 110 and/or the second camera system 112 may be distributed throughout the distribution center(s) 202. For example, the one or more of the first camera system 110 or the second camera system 112 may be positioned to capture video images in one or more of: the item picking area, the item conveyor system, the item consolidation area, and the item packing area. In another example, the one or more of the second camera system 112 may be positioned to capture video images in the item loading area. Moreover, one or more of the sensor(s) 126 may be distributed in one or more of the distribution center(s) 202, for example, to detect activity that can be associated with one or more events that may have caused damage to a retail item being considered (e.g., based on timing and location). The sensor(s) 126 may also detect contact to an item in excess of a threshold, displacement of an item, and/or other such sensor data. An event that may cause some damage to a retail item may correspond to, for example, an associate and/or robotic device retrieving the item or an item near a damaged item. Further, the location of the item within the distribution center is typically known, or is known to be within a field of view of one or more known cameras. Accordingly, image and/or video segments, data and the like from those cameras may be processed to detect displacement within a threshold distance of the item of interest. This video data can be further processed through video analytics by the control circuit 102 and/or other image processing system, evaluated by an associate, evaluated by a customer, and/or other evaluation, to identify activity around the item and/or based on one or more predefined thresholds (e.g., speed at which a robotic system approaches and/or interacts with the item or another item in proximity to the item, contact by a transport vehicle (e.g., forklift vehicle, dolly, pallet jack, etc.), and/or other such predefined actives that are known to potentially cause damage to items).

In another non-limiting illustrative example, the stage 2 in FIG. 2 may include activities associated with transporting the item 302 to the deliver destination(s) 206. The third camera system 114 may capture the third plurality of video streams including video images during the loading, the transport and/or the unloading of the items 302, 304, 306, 308, 310. Some embodiments may use sensor data (e.g., RFID tag data) to identify timing of when a product is loaded into the vehicle to access video data corresponding to when an item of interest was loaded or unloaded from the vehicle, and to access relevant video data corresponding to those times to be evaluated in attempts to identify a potential cause of damage to the product.

In a non-limiting illustrative scenario, an event may have happened while the transport vehicle 204 is en route to the delivery destination(s) 206. The event may correspond to the transport vehicle 204 driving over a pot hole causing a sudden up and down movement of the transport vehicle 204. In another non-limiting illustrative scenario, the event may be associated with one or more of: a shock event, a drop event, a shrinkage event, a tempering event, and a damage event. Such events may be detected by one or more sensors. The sensor data can be used by the control circuit 102 to identify time periods when the event occurred and access the relevant video data corresponding to those time periods. Similarly, the sensor data may provide information regarding the potential damage (e.g., acceleration in excess of one or more thresholds that correspond to expected or potential damage occurring in the past, impacts that are in excess of one or more threshold that correspond to expected or potential damage occurring in the past, and the like). Further, such thresholds can be dependent on the item of interest (e.g., items in glass jars may have a first threshold, while canned items may have a second threshold, while fresh produce may have a third threshold). The up and down movement may have caused the first item 302 to bump into the second item 304 and may have damaged the first item 302. However, as shown in FIG. 3, the first item 302 is hidden behind the third item 306, rendering the camera system 114 of FIG. 1 unable to capture the event. Thus, to a user investigating the cause of the damage to the first item 302, the system 100 may use displacement of a particular item to determine displacement of a monitored item. The user may be, for example, an associate of the retail facility, an outside investigator, or any individual tasked to investigate cause(s) of an event as described herein.

For example, the control circuit 102 may determine displacement of the first item 302 (e.g., through video analytics, sensor data, etc.) as it slides towards the second item 304 and bumping into the second item 304, based on detected displacement of the third item 306, which may be positioned proximate the first item 302. The control circuit 102 may identify the third item 306 in the third plurality of video streams captured by the camera system 114. The control circuit 102 may also determine that the first item 302 is placed behind the third item 306, and/or be notified of the placement of items based on a loading sequence, sensor data that the first item 302 is placed behind the third item 306 (e.g., RFID tag data, weight data from weight sensors cooperated with the shelf, and/or other such sensor data), other such information, or any combination thereof. The control circuit 102 may determine the displacement of the first item 302 based on the displacement of the third item 306. By another approach, the control circuit 102 may determine the displacement of the first item 302 based on displacement of at least one of the second item 304, the fourth item 308, or the fifth item 310 in addition to the displacement of the third item 306.

In another implementation, in addition to using the displacement of the third item 306, the control circuit 102 may also determine sensor readings of one or more of the sensor(s) 126 that are configured to monitor one or more items in the transport vehicle 204. For example, the sensor(s) 126 may correspond to, for example, an accelerometer, impact sensor, distance measurement sensor, RFID tag reader, moisture sensor, temperature sensor, other such sensors, or two or more of such sensors. The control circuit 102 may determine displacement of the third item 306 based on data received from one or more sensors (e.g., the accelerometer). In another example, in addition to the accelerometer, the control circuit 102 may also receive data associated with an audio sensor. For example, the control circuit or other audio processing system can be configured to process audio data relative to predefined known audio streams or signatures that correspond to known item damaging events in attempts to identify potential events that may be flagged as potential incidents of damage. As such, the system 100 may determine, for example, the cause of damage to the first item 302 based on the displacement of the third item 306, the one or more sensors data, the processed audio data, and/or the identified potential events. In another implementation, the control circuit 102 may correlate the displacement of the third item 306 and/or the displacement of the first item 302 with sensor data received from the sensor(s) 126, such as, for example, the accelerometer and/or the audio sensor, among other type of sensors. The sensor(s) 126 may also include temperature sensors, biosensors, motion detectors, pressure sensors, level sensors, proximity and displacement sensors, flow sensors, distance measurement sensors, other such sensors, or combination of two or more sensors configured to take environmental, chemical, physical, or motion readings.

Referring to FIG. 3, the shelf 300 may correspond to a shelf in the distribution center(s) 202, the transport vehicle 204, and/or the delivery destination(s) 206 of FIG. 2. In an illustrative non-limiting example, the shelf 300 is shown as having items 306, 308, 310 in the front row while items 302, 304 are in the back row. In other embodiments, the shelf 300 may be included in a rack having multiple shelves, where each shelf may have a single row and/or a multiple rows. In another illustrative non-limiting example, the stage 3 in FIG. 2 may include activities associated with delivering the item 302 to a customer or a receiver at the delivery destination(s) 206, such as, for example, unloading the item 302 off the transport vehicle 204 and/or delivering the item 302 to a customer or a receiver (e.g., a designated receiver by the customer or another delivery agent). In such example, the delivery agent, the customer, the receiver or other such person may notice that the first item 302 is damaged. By one approach, the delivery agent may initiate a problem resolution ticket in the problem resolution system. By another approach, the customer or the receiver may submit a complaint via a customer interface to the problem resolution system. The customer interface to the problem resolution system may be accessed through the customer's electronic device. The problem resolution system (as previously described) and/or another system configured to receive and process customer complaints may communicate the complaint to the system 100 of FIG. 1.

Furthermore, for example, in response to a notification of an issue, problem, and/or damage to the first item 302, the control circuit 102 may initiate determining and/or identifying the plurality of video streams received from the camera systems 110, 112, 114, 116 that are associated with the first item 302. In this scenario, the first item 302 may have been damaged during a delivery. By one approach, to determine and/or identify the plurality of video streams associated with the first item 302, the control circuit 102 may process by initiating an image processing and/or an image recognition to the plurality of video streams. The control circuit 102 may identify the first item 302 in the processed plurality of video streams. In one configuration, the control circuit 102, may also use the sensed data received from sensor(s) 126 to identify particular time period in the plurality of video streams that may correspond to an event that affected the first item 302. As such, video data associated with the first item 302 may be extracted from the processed plurality of video streams. In another configuration, the control circuit 102 may further filter and/or reduce the time period to a shorter time period (e.g., while being loaded, acceleration during transport in excess of a threshold, an impact in excess of an impact threshold, while being unloaded, etc.) to identify possible cause of damage to the first item 302.

By another approach, the extracted video data are aggregated to form an item distribution record that records the displacement of the first item 302 along the distribution chain 200. The control circuit 102 may store the item distribution record in the item record database 108. By another approach, the control circuit 102 may associate the item distribution record with an order for the first item 302 in the item record database 108. As such, the item distribution record may be provided by the control circuit 102 to a user (e.g., a customer, an investigator, an associate, among other individuals with possible use and/or interest on the item distribution record) associated with the order via the item record user interface 118. In one configuration, the user may include a user associated with a security system 120, the employee management system 122, and/or the supply chain system 124. In one example, the security system 120 may be configured to include servers, computers, and/or systems that are associated with a retail facility's security posture. In one configuration, the security system 120 may include the camera systems 110, 112, 114, 116. In another example, the employee management system 122 may be configured to include servers, computers, and/or systems that are associated with individuals that were hired, contracted, and/or enlisted by the retail facility to be involved with the retail facility's operations. In yet another example, the supply chain system 124 may be configured to include servers, computers, and/or systems that are associated with production, acquisition, and/or distribution of inventories of the retail facility.

Figure 4:
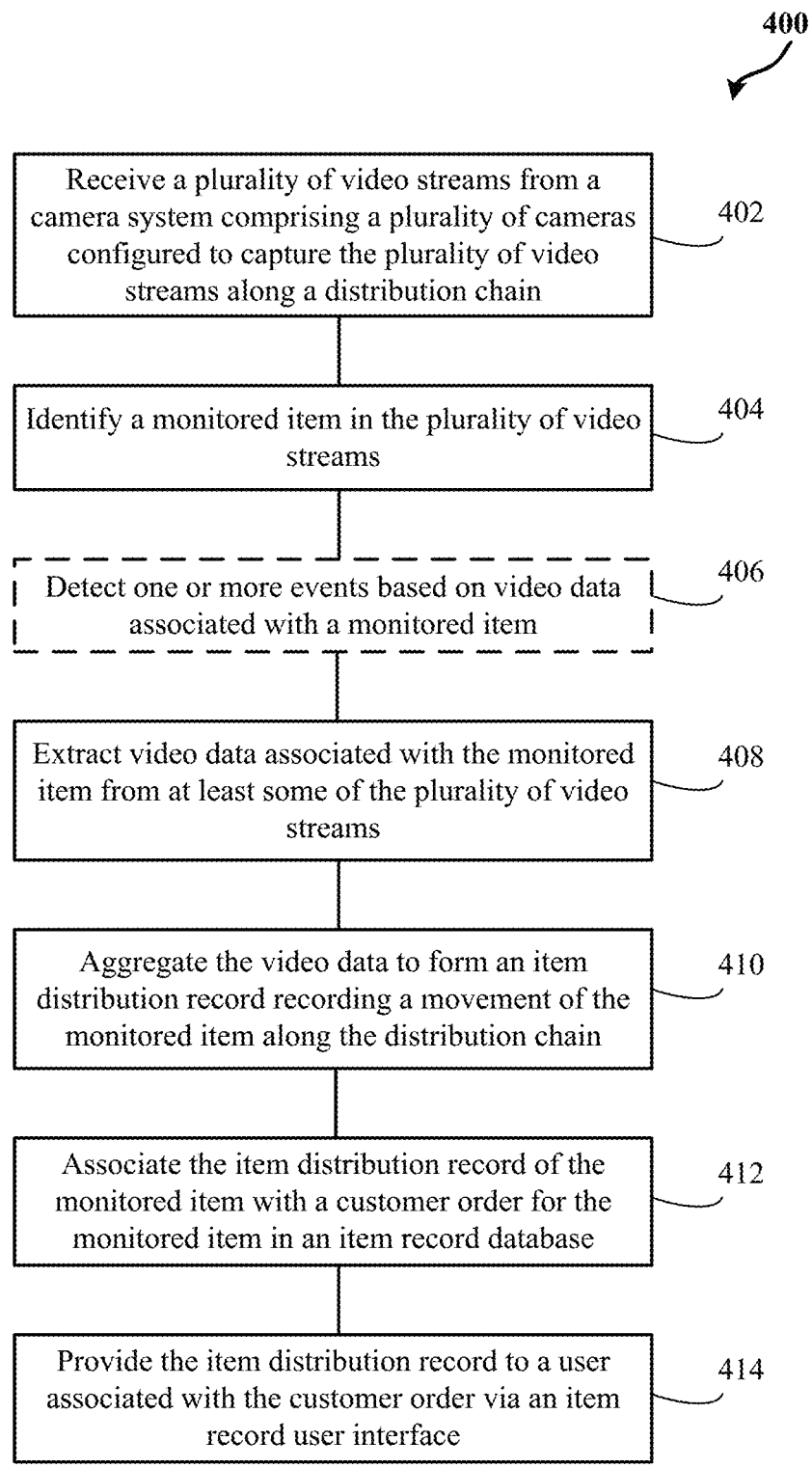
FIG. 4 shows a flow diagram of an exemplary process of monitoring item distribution in accordance with some embodiments.

FIG. 4 illustrates a flow diagram of an exemplary method 400 for monitoring item distribution. The exemplary method 400 may be implemented in the system 100 of FIG. 1. One or more steps in the method 400 may be implemented in the distribution chain 200 of FIG. 2 and/or applied in the shelf 300 of FIG. 3. The method 400 includes, at step 402, receiving a plurality of video streams from a camera system comprising a plurality of cameras. The plurality of cameras may capture the plurality of video streams along a distribution chain. The plurality of cameras may include at least one distribution center camera system and at least one on-vehicle camera system configured to capture images of a storage compartment of a transport vehicle. The camera system may include at least one of the first camera system 110, the second camera system 112, the third camera system 114, or the fourth camera system 116. At step 404, identifying a monitored item in the plurality of video streams by, for example, the control circuit 102 of FIG. 1. The monitored item may correspond to an item ordered by a customer. The method 400 may include, optional step 406, detecting one or more events based on video data associated with the monitored item. The video data may include one or more event tags identifying detected events associated with the monitored item. At step 408, extracting video data associated with the monitored item from at least some of the plurality of video streams. The video data may include one or more of video segments, video object data, movement vector data, and movement path data that are associated with the monitored item. At step 410, the video data may be aggregated to form an item distribution record recording a movement (or displacement) of the monitored item along the distribution chain. The method 400 may also include, at step 412, associating the item distribution record of the monitored item with a customer order for the monitored item in an item record database. By one approach, the method 400, at step 414, may include providing the item distribution record to a user associated with the customer order via an item record user interface.

Figure 5:
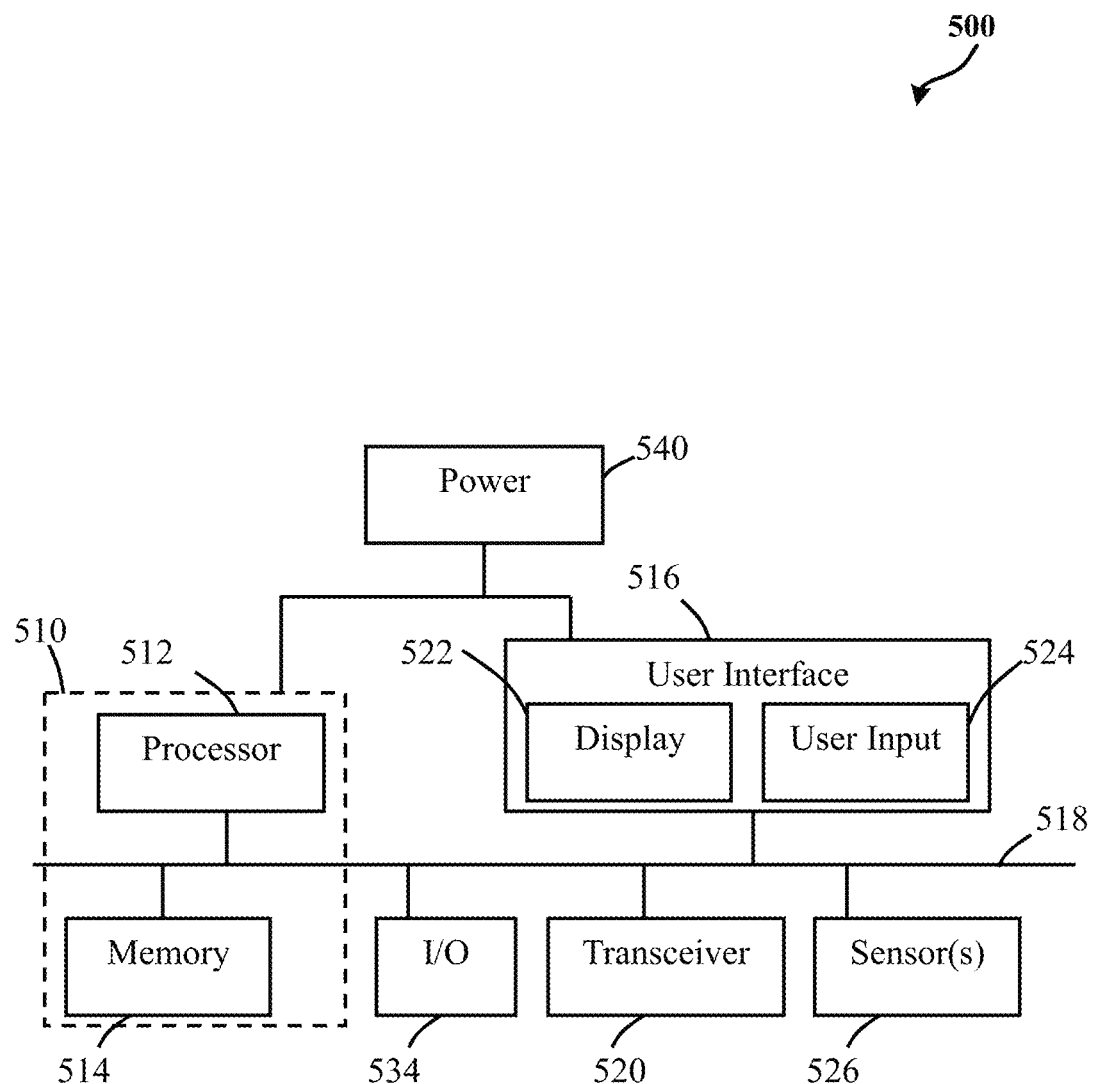
FIG. 5 illustrates an exemplary system for use in implementing methods, techniques, devices, apparatuses, systems, servers, sources and monitoring item distribution, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the system 100 of FIG. 1, the method 400 of FIG. 4, and/or other above or below mentioned systems or devices, or parts of such circuits, circuitry, functionality, systems, apparatuses, processes, or devices. For example, the system 500 may be used to implement some or all of the system to monitor retail item distribution 100, the item record database 108, the plurality of camera systems 101, the security system 120, the employee management system 122, the supply chain system 124, the control circuit 102, and/or other such components, circuitry, functionality and/or devices. However, the use of the system 500 or any portion thereof is certainly not required.

By way of example, the system 500 may comprise a control circuit or processor module 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like. For example, the system may implement the system to monitor retail item distribution 100 with the control circuit being a retail item distribution control circuit.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network (e.g., a local area network (LAN), the Internet, wide area network (WAN), etc.), communication link 518, other networks or communication channels with other devices and/or other such communications or combination of two or more of such communication methods. Further the transceiver 520 can be configured for wired, wireless, optical, fiber optical cable, satellite, or other such communication configurations or combinations of two or more of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports. The I/O interface 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 526 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor readable and/or computer readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

Further, descriptions of some embodiments of blockchain technology are provided with reference to FIG. 6-11 herein. In some embodiments of the invention described above, blockchain technology may be utilized to record retail item distribution, item distribution record, monitored retail items, plurality of video streams, and/or extracted video data, among others. One or more of the system and/or apparatus for monitoring item distribution described herein may comprise a node in a distributed blockchain system storing a copy of the blockchain record. Updates to the blockchain may comprise formation of item distribution record, extraction of video data, association of the item distribution record with customer order, among others, and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (bitcoin.org/bitcoin.pdf), the entirety of which is incorporated herein by reference.

Figure 6:
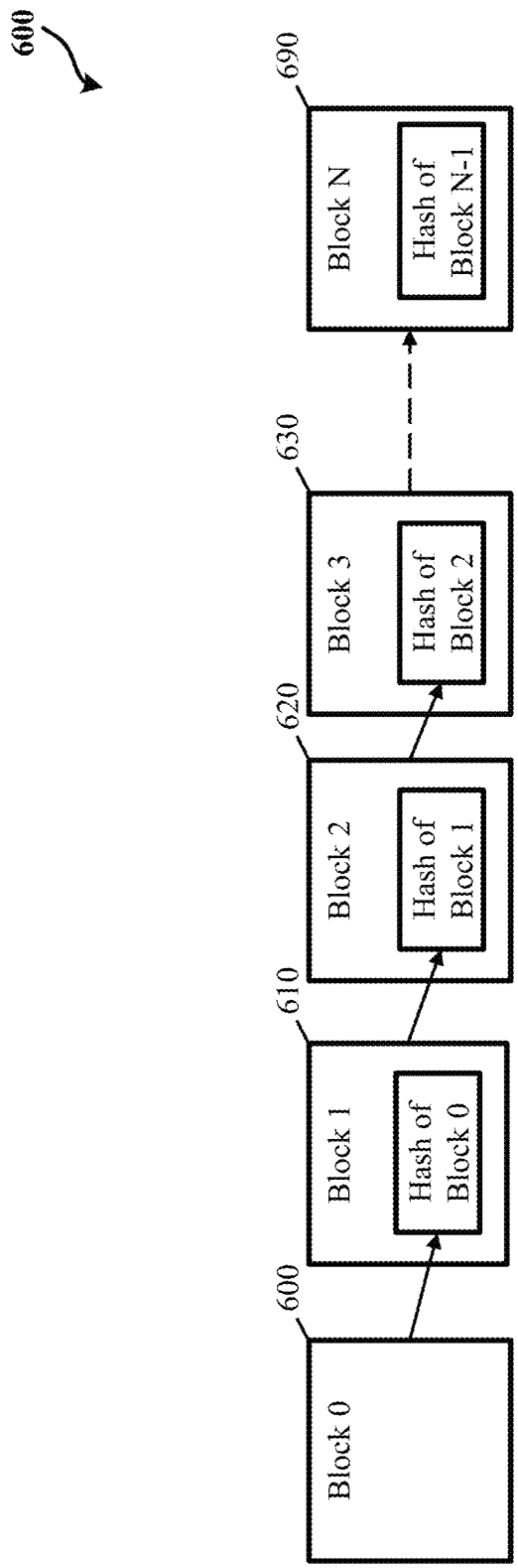
FIG. 6 comprises an illustration of blocks as configured in accordance with various embodiments of these teachings.

Now referring to FIG. 6, an illustration of a blockchain according to some embodiments is shown. In some embodiments, a blockchain comprises a hash chain or a hash tree in which each block added in the chain contains a hash of the previous block. In FIG. 6, block 0 600 represents a genesis block of the chain. Block 1 610 contains a hash of block 0 600, block 2 620 contains a hash of block 1 610, block 3 630 contains a hash of block 2 620, and so forth. Continuing down the chain, block N contains a hash of block N-1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. For example, in the Bitcoin system, "miners" are nodes that compete to provide proof-of-work to form a new block, and the first successful miner of a new block earns Bitcoin currency in return.

Figure 7:
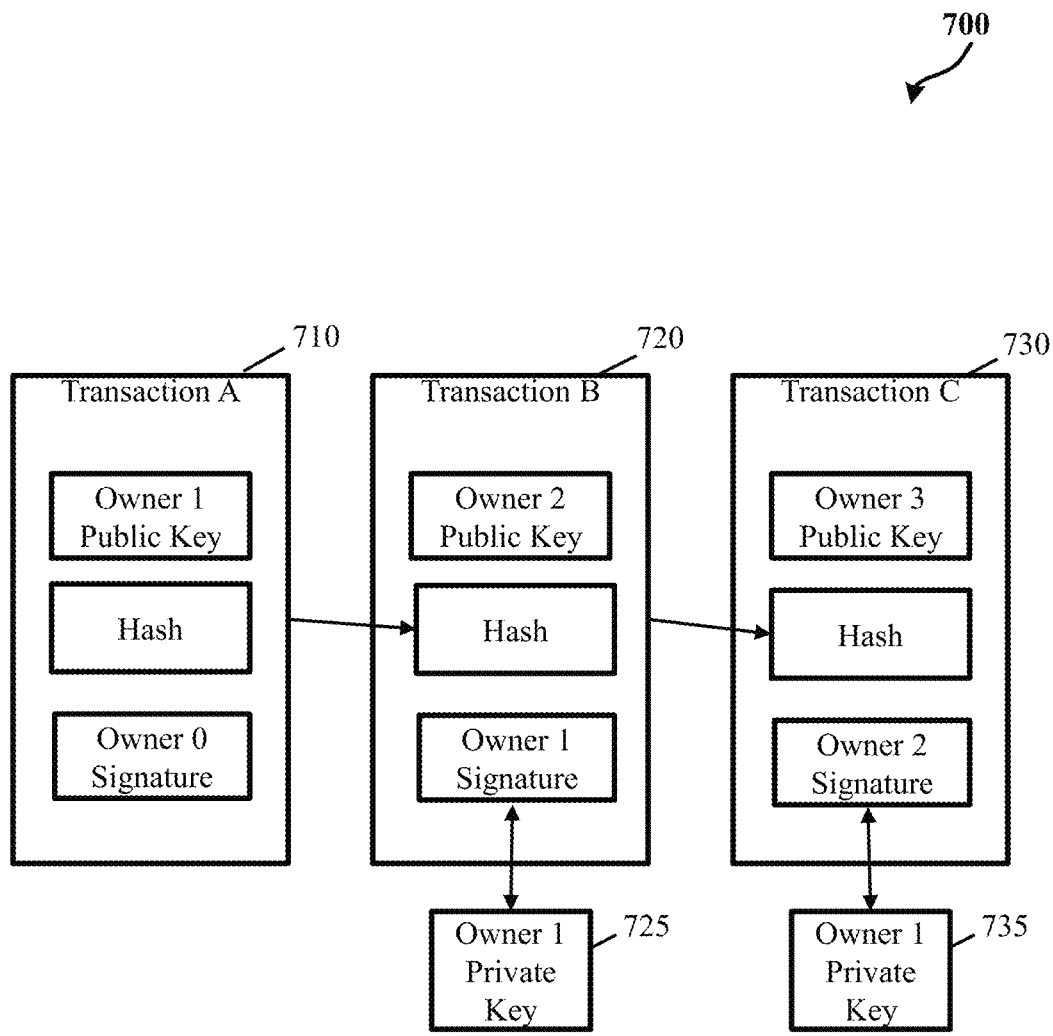
FIG. 7 comprises an illustration of transactions configured in accordance with various embodiments of these teachings.

Now referring to FIG. 7, an illustration of blockchain based transactions according to some embodiments is shown. In some embodiments, the blockchain illustrated in FIG. 7 comprises a hash chain protected by private/public key encryption. Transaction A 710 represents a transaction recorded in a block of a blockchain showing that owner 1 (recipient) obtained an asset from owner 0 (sender). Transaction A 710 contains owner's 1 public key and owner 0's signature for the transaction and a hash of a previous block. When owner 1 transfers the asset to owner 2, a block containing transaction B 720 is formed. The record of transaction B 720 comprises the public key of owner 2 (recipient), a hash of the previous block, and owner 1's signature for the transaction that is signed with the owner 1's private key 725 and verified using owner 1's public key in transaction A 710. When owner 2 transfers the asset to owner 3, a block containing transaction C 730 is formed. The record of transaction C 730 comprises the public key of owner 3 (recipient), a hash of the previous block, and owner 2's signature for the transaction that is signed by owner 2's private key 735 and verified using owner 2's public key from transaction B 720. In some embodiments, when each transaction record is created, the system may check previous transaction records and the current owner's private and public key signature to determine whether the transaction is valid. In some embodiments, transactions are be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 7 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 8:
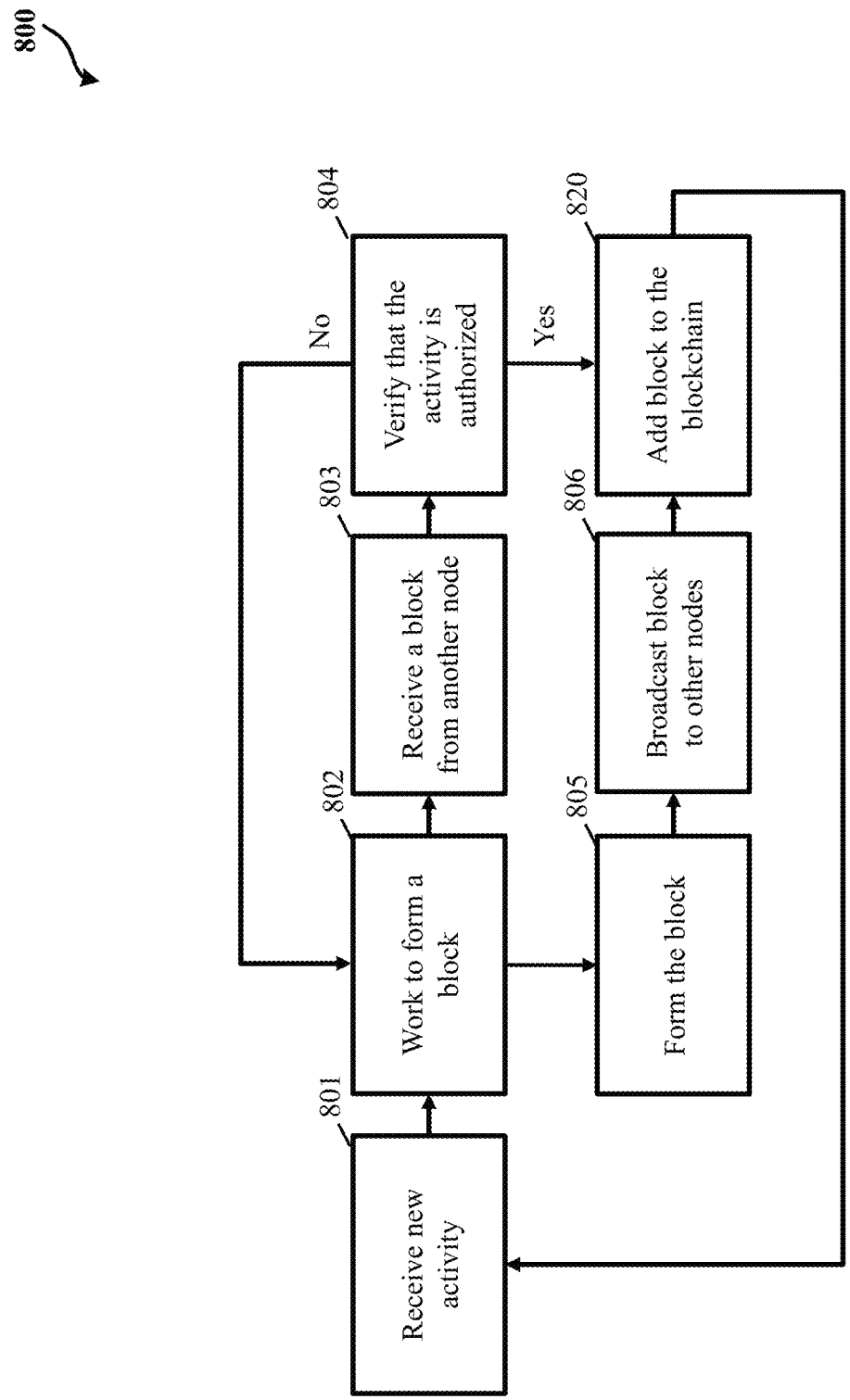
FIG. 8 comprises a flow diagram in accordance with various embodiments of these teachings.

Now referring to FIG. 8, a flow diagram according to some embodiments is shown. In some embodiments, the steps shown in FIG. 8 may be performed by a processor-based device, such as a computer system, a server, a distributed server, a timestamp server, a blockchain node, and the like. In some embodiments, the steps in FIG. 8 may be performed by one or more of the nodes in a system using blockchain for record keeping.

In step 801, a node receives a new activity. The new activity may comprise an update to the record being kept in the form of a blockchain. In some embodiments, for blockchain supported digital or physical asset record keeping, the new activity may comprise a asset transaction. In some embodiments, the new activity may be broadcasted to a plurality of nodes on the network prior to step 801. In step 802, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 802, if the node successfully forms a block in step 805 prior to receiving a block from another node, the node broadcasts the block to other nodes over the network in step 806. In some embodiments, in a system with incentive features, the first node to form a block may be permitted to add incentive payment to itself in the newly formed block.

In step 820, the node then adds the block to its copy of the blockchain. In the event that the node receives a block formed by another node in step 803 prior to being able to form the block, the node works to verify that the activity recorded in the received block is authorized in step 804. In some embodiments, the node may further check the new block against system consensus rules for blocks and activities to verify whether the block is properly formed. If the new block is not authorized, the node may reject the block update and return to step 802 to continue to work to form the block. If the new block is verified by the node, the node may express its approval by adding the received block to its copy of the blockchain in step 820. After a block is added, the node then returns to step 801 to form the next block using the newly extended blockchain for the hash in the new block.

In some embodiments, in the event one or more blocks having the same block number is received after step 820, the node may verify the later arriving blocks and temporarily store these block if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 801.

Figure 9:
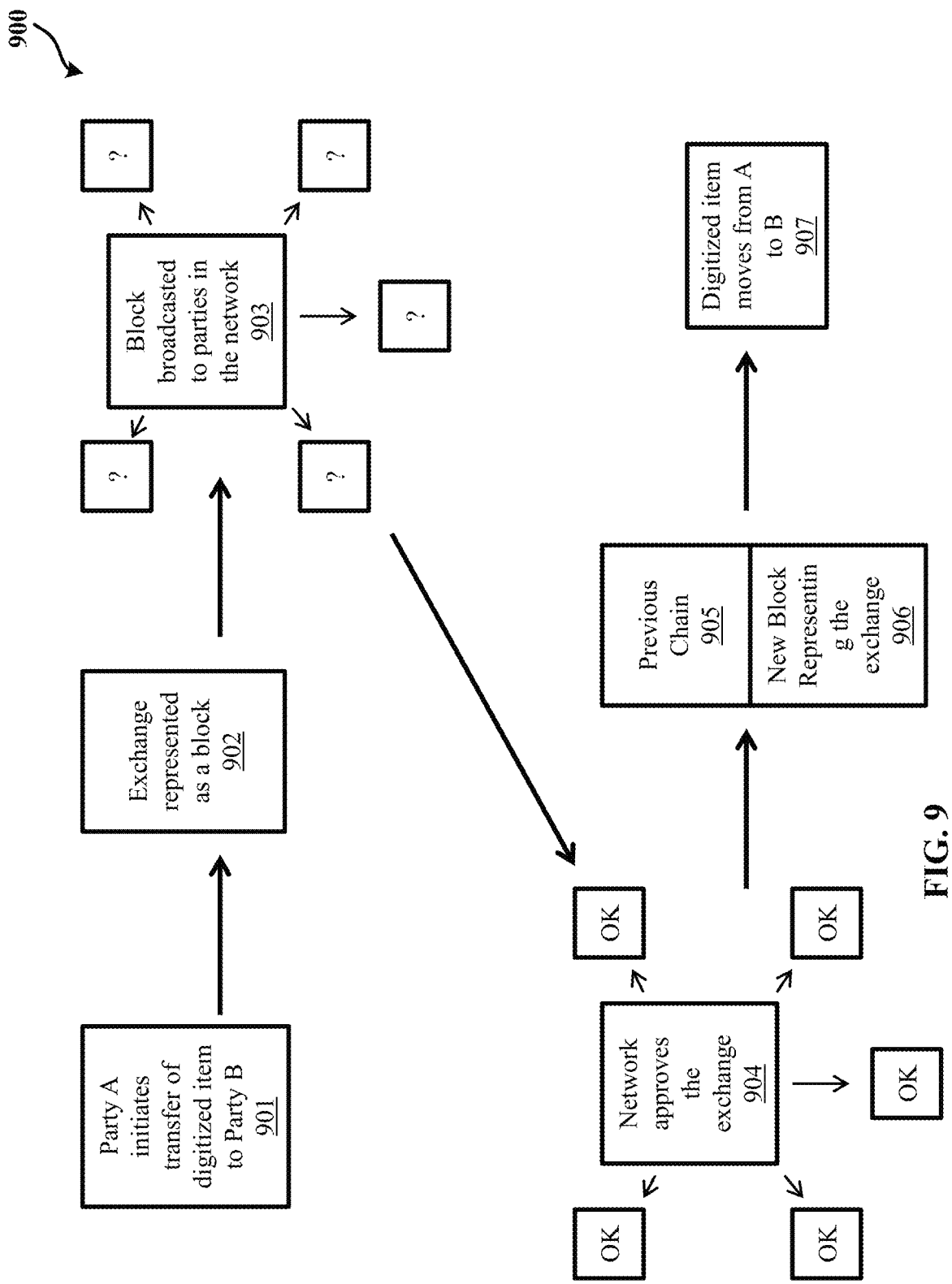
FIG. 9 comprises a process diagram as configured in accordance with various embodiments of these teachings.

Now referring to FIG. 9, a process diagram a blockchain update according to some implementations in shown. In step 901, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 902, the exchange initiated in step 901 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide prove of work to for block the may earn a Bitcoin. In some embodiments, a block may comprise one or more transactions between different parties that are broadcasted to the nodes. In step 903, the block is broadcasted to parties in the network. In step 904, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the asset he/she s seeks to transfer). In some embodiments, a block may be approved with consensus of the nodes in the network. After a block is approved, the new block 906 representing the exchange is added to the existing chain 905 comprising blocks that chronologically precede the new block 906. The new block 906 may contain the transaction(s) and a hash of one or more blocks in the existing chain 905. In some embodiments, each node may then update their copy of the blockchain with the new block and continue to work on extending the chain with additional transactions. In step 907, when the chain is updated with the new block, the digitized item is moved from party A to party B.

Figure 10:
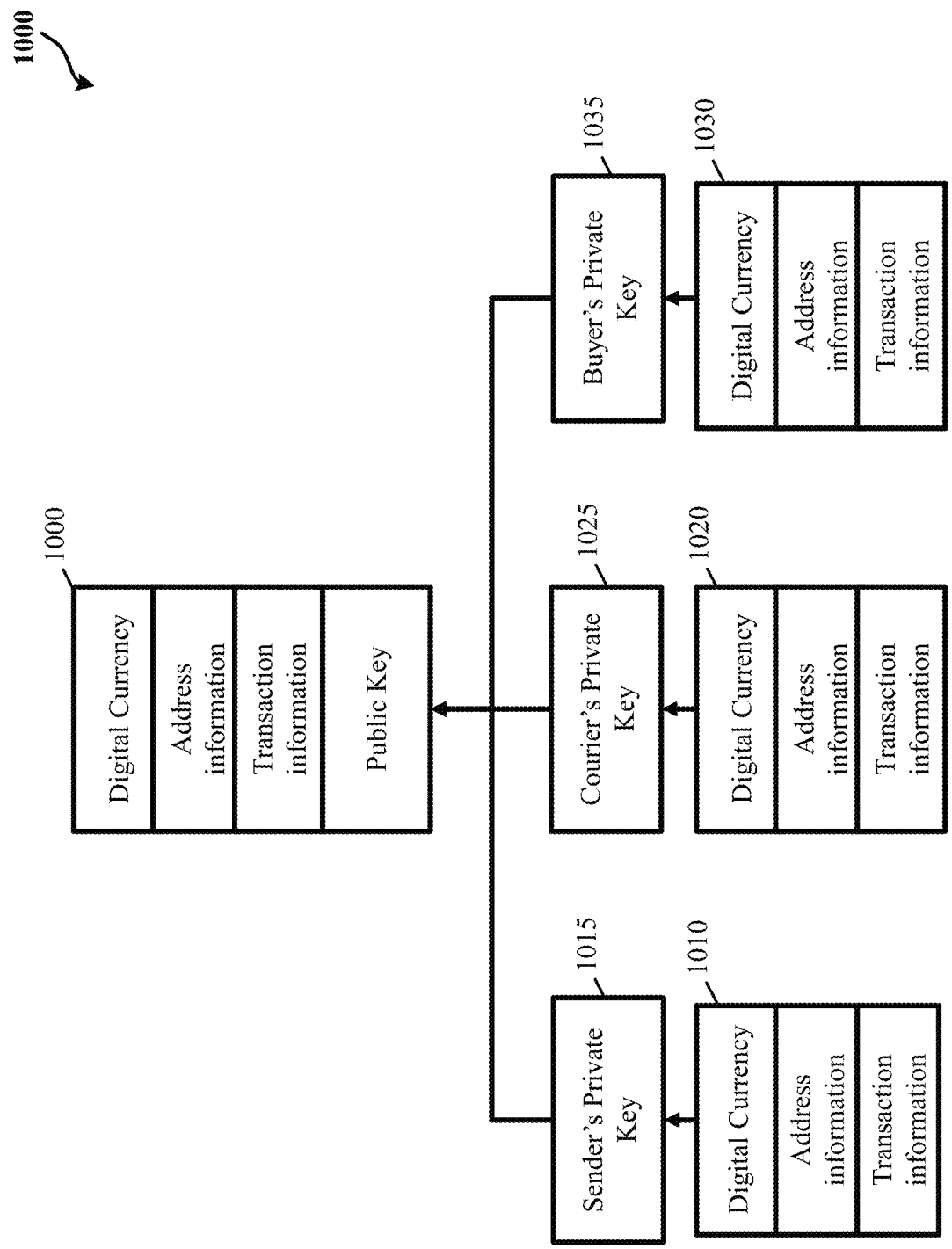
FIG. 10 comprises an illustration of a delivery record configured in accordance with various embodiments of these teachings.

Now referring to FIG. 10, a diagram of a blockchain according to some embodiments in shown. FIG. 10 comprises an example of an implementation of a blockchain system for delivery service record keeping. The delivery record 1000 comprises digital currency information, address information, transaction information, and a public key associated with one or more of a sender, a courier, and a buyer. In some embodiments, nodes associated the sender, the courier, and the buyer may each store a copy of the delivery record 1010, 1020, and 1030 respectively. In some embodiments, the delivery record 1000 comprises a public key that allows the sender, the courier, and/or the buyer to view and/or update the delivery record 1000 using their private keys 1015, 1025, and the 1035 respectively. For example, when a package is transferred from a sender to the courier, the sender may use the sender's private key 1015 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 1025 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 10, the delivery record may be updated by one or more of the sender, courier, and the buyer to form a record of the transaction without a trusted third party while preventing unauthorized modifications to the record. In some embodiments, the blockchain based transactions may further function to include transfers of digital currency with the completion of the transfer of physical asset. With the distributed database and peer-to-peer verification of a blockchain system, the sender, the courier, and the buyer can each have confidence in the authenticity and accuracy of the delivery record stored in the form of a blockchain.

Figure 11:
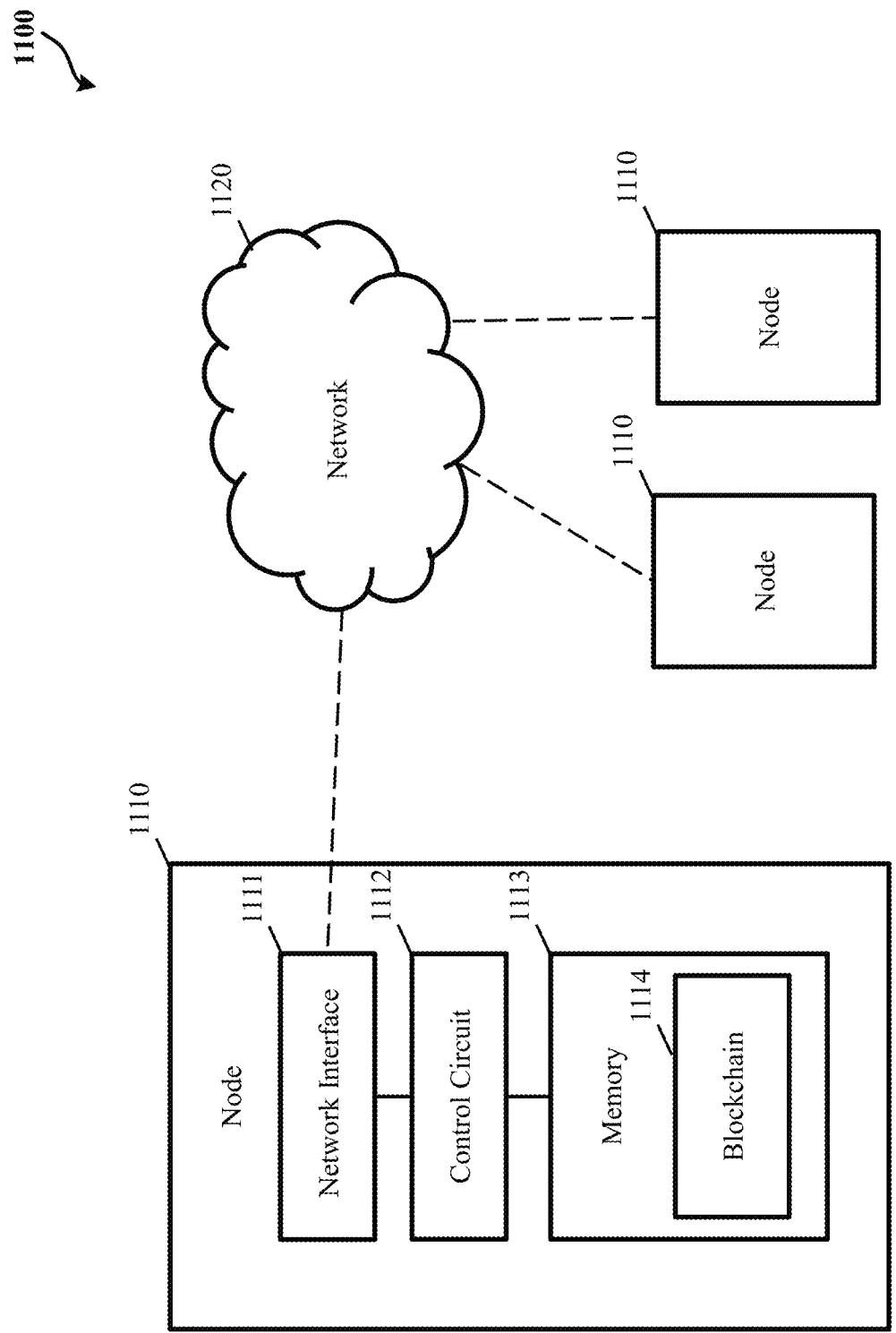
FIG. 11 comprise a system diagram configured in accordance with various embodiments of these teachings.

Now referring to FIG. 11, a system according to some embodiments is shown. A distributed blockchain system comprises a plurality of nodes 1110 communicating over a network 1120. In some embodiments, the nodes 1110 may be comprise a distributed blockchain server and/or a distributed timestamp server. In some embodiments, one or more nodes 1110 may comprise or be similar to a "miner" device on the Bitcoin network. Each node 1110 in the system comprises a network interface 1111, a control circuit 1112, and a memory 1113.

The control circuit 1112 may comprise a processor, a microprocessor, and the like and may be configured to execute computer readable instructions stored on a computer readable storage memory 1113. The computer readable storage memory may comprise volatile and/or non-volatile memory and have stored upon it a set of computer readable instructions which, when executed by the control circuit 1112, causes the node 1110 update the blockchain 1114 stored in the memory 1113 based on communications with other nodes 1110 over the network 1120. In some embodiments, the control circuit 1112 may further be configured to extend the blockchain 1114 by processing updates to form new blocks for the blockchain 1114. Generally, each node may store a version of the blockchain 1114, and together, may form a distributed database. In some embodiments, each node 1110 may be configured to perform one or more steps described with reference to FIGS. 8-9 herein.

The network interface 1111 may comprise one or more network devices configured to allow the control circuit to receive and transmit information via the network 1120. In some embodiments, the network interface 1111 may comprise one or more of a network adapter, a modem, a router, a data port, a transceiver, and the like. The network 1120 may comprise a communication network configured to allow one or more nodes 1110 to exchange data. In some embodiments, the network 1120 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown in, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may use to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one of more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain based system allows content use, content exchange, and the use of content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that uses one or more of cryptography, private/public key encryption, proof standard, distributed timestamp server, and inventive schemes to regulate how new blocks may be added to the chain. In some embodiments, blockchain may refer to the technology that underlies the Bitcoin system, a "sidechain" that uses the Bitcoin system for authentication and/or verification, or an alternative blockchain ("altchain") that is based on bitcoin concept and/or code but are generally independent of the Bitcoin system.

Descriptions of embodiments of blockchain technology are provided herein as illustrations and examples only. The concepts of the blockchain system may be variously modified and adapted for different applications.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to monitor a retail item along a distribution chain, comprising:
a camera system comprising a plurality of cameras configured to capture a plurality of video streams along a distribution chain, the plurality of cameras comprises at least one distribution center camera system, at least one on-vehicle camera system configured to capture images of a storage compartment of a transport vehicle, and at least a camera on a delivery agent's person configured to capture images of a delivery at a delivery destination;
an item record database comprising one or more item distribution records corresponding to each of multiple different monitored retail items;
one or more sensors along the distribution chain operatively coupled to a control circuit, the one or more sensors configured to provide sensed data to the control circuit; and
the control circuit coupled to the item record database and the one or more sensors, the control circuit being configured to:
access the plurality of video streams throughout the distribution chain, the plurality of video streams are captured by the camera system;
detect one or more events based on the plurality of video streams and the sensed data;
identify, in the plurality of video streams, a monitored item of one or more monitored items based on the detected one or more events;
extract video data associated with the monitored item from at least one of the plurality of video streams;
aggregate the video data to form an item distribution record recording a movement of the monitored item along the distribution chain;
associate the item distribution record of the monitored item with a customer order for the monitored item in the item record database; and
provide the item distribution record to a user associated with the customer order via an item record user interface.

2. The system of claim 1, wherein the video data associated with the monitored item comprises one or more of video segments, video object data, movement vector data, and movement path data.

3. The system of claim 1, wherein the control circuit is further configured to tag the detected one or more events in the plurality of video streams, wherein the video data comprises one or more event tags identifying detected events associated with the monitored item, and wherein the one or more event tags comprises tags associated with one or more of: a shock event, a drop event, a shrinkage event, a tempering event, and a damage event.

4. The system of claim 1, wherein the detected one or more events comprise a shock event.

5. The system of claim 1, wherein aggregating the video data comprises stitching together a plurality video segments associated with the monitored item from the at least one of the plurality of video streams in chronological order.

6. The system of claim 1, wherein the at least one distribution center camera system comprises cameras positioned to capture video in one or more of: an item picking area, an item conveyor system, an item consolidation area, an item packing area, and an item loading area.

7. The system of claim 1, wherein the camera system comprises at least one camera coupled to an unmanned ground delivery vehicle or an unmanned aerial delivery vehicle.

8. The system of claim 1, wherein the distribution chain comprises a plurality of distribution centers and a plurality of transport vehicles each monitored by one or more cameras of the plurality of cameras.

9. The system of claim 1, wherein aggregating the video data comprises updating a blockchain maintained at a plurality of computer systems with the video data associated with the monitored item from the at least one of the plurality of video streams.

10. The system of claim 1, wherein identifying the monitored item in the plurality of video streams comprises associating the monitored item with a second item, and using a movement of the second item in the plurality of video streams to determine the movement of the first item.

11. A method for monitoring a retail item along a distribution chain, comprising:
receiving a plurality of video streams from a camera system comprising a plurality of cameras configured to capture the plurality of video streams along a distribution chain, the plurality of cameras comprises at least one distribution center camera system, at least one on-vehicle camera system configured to capture images of a storage compartment of a transport vehicle, and at least a camera on a delivery agent's person configured to capture images of a delivery at a delivery destination;
receiving sensed data from one or more sensors along the distribution chain;
detecting one or more events based on the plurality of video streams and the sensed data;
identifying, with a control circuit, a monitored item in the plurality of video streams based on the detected one or more events;
extracting, with the control circuit, video data associated with the monitored item from at least one of the plurality of video streams;
aggregating, with the control circuit, the video data to form an item distribution record recording a movement of the monitored item along the distribution chain;
associating the item distribution record of the monitored item with a customer order for the monitored item in an item record database; and
providing the item distribution record to a user associated with the customer order via an item record user interface.

12. The method of claim 11, wherein the video data associated with the monitored item comprises one or more of video segments, video object data, movement vector data, and movement path data.

13. The method of claim 11, further comprising tagging the detected one or more events in the plurality of video streams, wherein the video data comprises one or more event tags identifying detected events associated with the monitored item, and wherein the one or more event tags comprises tags associated with one or more of: a shock event, a drop event, a shrinkage event, a tempering event, and a damage event.

14. The method of claim 11, wherein the one or more events comprise a shock event.

15. The method of claim 11, wherein aggregating the video data comprises stitching together a plurality video segments associated with the monitored item from the at least one of the plurality of video streams in chronological order.

16. The method of claim 11, wherein the at least one distribution center camera system comprises cameras positioned to capture video in one or more of: an item picking area, an item conveyor system, an item consolidation area, an item packing area, and an item loading area.

17. The method of claim 11, wherein the camera system comprises at least one camera coupled to an unmanned ground delivery vehicle or an unmanned aerial delivery vehicle.

18. The method of claim 11, wherein the distribution chain comprises a plurality of distribution centers and a plurality of transport vehicles each monitored by one or more cameras of the plurality of cameras.

19. The method of claim 11, wherein aggregating the video data comprises updating a blockchain maintained at a plurality of computer systems with the video data associated with the monitored item from the at least one of the plurality of video streams.

20. The method of claim 11, wherein identifying the monitored item in the plurality of video streams comprises associating the monitored item with a second item, and using a movement of the second item in the plurality of video streams to determine the movement of the first item.

21. An apparatus for monitoring a retail item along a distribution chain comprising:
a non-transitory storage medium storing a set of computer readable instructions; and
a control circuit configured to execute the set of computer readable instructions which causes the control circuit to:
receive a plurality of video streams from a camera system comprising a plurality of cameras configured to capture the plurality of video streams along a distribution chain, the plurality of cameras comprises at least one distribution center camera system, at least one on-vehicle camera system configured to capture images of a storage compartment of a transport vehicle, and at least a camera on a delivery agent's person configured to capture images of a delivery at a delivery destination;
receive sensed data from one or more sensors along the distribution chain;
detecting one or more events based on the plurality of video streams and the sensed data;
identify a monitored item in the plurality of video streams based on the detected one or more events;
extract video data associated with the monitored item from at least one of the plurality of video streams;
aggregate the video data to form an item distribution record recording a movement of the monitored item along the distribution chain;
associate the item distribution record of the monitored item with a customer order for the monitored item in an item record database; and
provide the item distribution record to a user associated with the customer order via an item record user interface.

22. The apparatus of claim 21, wherein the distribution chain comprises a plurality of distribution centers and a plurality of transport vehicles each monitored by one or more cameras of the plurality of cameras.

* * * * *